(12) United States Patent
Barnard et al.

(10) Patent No.: US 8,408,493 B2
(45) Date of Patent: Apr. 2, 2013

(54) COMPOSITE STRINGER END TRIM

(75) Inventors: Joshua D. Barnard, Madison, AL (US);
Brian W. Arent, Huntsville, AL (US);
Chun-Liang Lin, Bellevue, WA (US);
Hangki Lee, Mill Creek, WA (US);
Carlos Alberto Paez, Dana Point, CA (US); Bernhard Dopker, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 379 days.

(21) Appl. No.: 12/783,057

(22) Filed: May 19, 2010

(65) Prior Publication Data

US 2011/0284693 A1  Nov. 24, 2011

(51) Int. Cl.
*B64C 1/06* (2006.01)

(52) U.S. Cl. .................... 244/119; 244/123.1

(58) Field of Classification Search .......... 244/119, 244/123.1, 123.8, 129.1, 131
See application file for complete search history.

(56) References Cited

U.S. PATENT DOCUMENTS

| | | | |
|---|---|---|---|
| 2,383,634 A | 8/1945 | Walter | |
| 7,159,822 B2 | 1/2007 | Grantham et al. | |
| 2006/0226287 A1 | 10/2006 | Grantham et al. | |
| 2008/0290214 A1* | 11/2008 | Guzman et al. | 244/119 |

FOREIGN PATENT DOCUMENTS

| | | |
|---|---|---|
| DE | 102007029500 A1 | 1/2009 |
| WO | 2011/033083 | 4/2011 |
| WO | 2011146194 A1 | 11/2011 |

OTHER PUBLICATIONS

Sanders, "Turbine Steam Path vol. IIIb: Mechanical Design and Manufacture," PennWell Corporation, Tulsa, OK, Mar. 2004, 3 pages; accessed Jul. 10, 2012, http://books.google.com/books?id=ptx5IPB6DmAC&pg=PA346&dq =Grodzinski+radius&source=bl&ots=xpZLmIDPCp&sig=_aQqDo-It7JjvEl7D7YYX63vX90&hl=en&ei=N4TgS8fzB4WOtAPR5uC0BQ&sa=X&oi=book_result&ct=result&resnum=1&ved=0CAUQ6AEwADgK#v=onepage&q&f=true.

International Search Report, dated Nov. 8, 2011, regarding Application No. PCT/US2011/033083 (WO2011146194), 5 pages.

Gates, "Boeing 787 may not fly this year," The Seattle Times, http://www.http://seattletimes.nwsource.com/html/boeingaerospace/2009513152_boeing22.html, Jul. 22, 2009, 3 pages.

* cited by examiner

*Primary Examiner* — Timothy D Collins
*Assistant Examiner* — Nicholas McFall
(74) *Attorney, Agent, or Firm* — Yee & Associates, P.C.

(57) ABSTRACT

A stringer having a stringer end trim that reduces pull-off forces in a stringer connection structure, including a stringer body; a stringer free edge provided on said stringer body; and a stringer end trim having at least one curvature provided in the stringer free edge forming the stringer connection structure.

28 Claims, 7 Drawing Sheets

COMPOSITE STRINGER END TRIM

TECHNICAL FIELD

The disclosure generally relates to composite stringers suitable for aerospace applications. More particularly, the disclosure relates to a composite stringer end trim which has one or multiple radii and is suitable for reducing stress and strain concentrations in a composite wing stringer web.

BACKGROUND

In modern commercial aircraft, high compression loads may be transitioned from an outer wing skin panel through a side-of-body (SOB) rib to an inner wing skin panel. On an aircraft with composite wings, composite stringers are commonly bonded to the composite wing skin panel. A large portion of the loads may be carried through stringers that are bonded to the wing skin panels. The inner and outer wing skin panels and stringers may be bolted to splice plates which are provided on the SOB or by some other suitable means to transfer loads between the wing skin panels. The offset of the splice plates relative to the centroid load path of the wing skin panels may induce a bending moment at the ends of the wing panels that is reacted as a pull-off load in the web of the stringer. The pull-off load may occur at the end of the stringer, where resistance to stress and strain concentrations may be needed. In metallic structure, this is less problematic due to the material system(s) isotropic properties with respect to in and out of plane loading. In composite structure, the out of plane loads act on the weaker laminate interface resulting in delamination of composites. In a typical composite skin/stringer design, stringers are co-bonded onto the skin panel. This configuration may create a situation where a large induced moment is applied along the skin/stringer bond line at the stringer free edge creating pull off forces. The intent of this trim is to reduce localized stress concentrations at the free edge of the stringer.

In structures in which the end of the composite wing stringer web which is attached to the SOB rib is solid from the stringer cap to the stringer base flange, the load path through the stringer end may impart undesired stress and strain to the cap and base flange of the stringer.

Accordingly, it would be advantageous to have an apparatus and method which takes into account one or more of the issues discussed above, as well as possibly other issues.

SUMMARY

A stringer end trim as disclosed will reduce the bending and axial stiffness at the stringer ends to essentially "un-load" the stringer ends. Furthermore, the end trim may distribute the load across a larger area and along the stringer trim cutout edge. As a result, pull-off force resistance capability and localized strain concentration resistance are both important characteristics of stringer end trim design. To minimize strain concentrations in the trim, a constantly varying radius may be the most effective way to reduce these strain concentrations along the cutout. In order to reduce the pull-off in a way that would meet the structural requirements of a given joint, additional considerations are necessary. It was determined that adding a transition between two constantly varying radii may provide additional capability by adding effective material to the stringer for bending stiffness enhancement while also minimizing strain concentration along the stringer trim.

In situations where the joint attachment is through both the base flange and cap flange of the composite stringer, a multiple radius trim may be the preferable method. The intent of this trim is to reduce localized stress and strain at the free edge by reducing the bending and axial stiffness near the SOB joint. Incorporating an end trim serves to distribute the load, and thus the stress and strain, in the composite structure near the SOB joint. In cases where such a trim is not practical due to spatial constraints, edge margin considerations, etc., a single variable radius trim may be preferred.

In cases where an attachment is preferred only via skin or stringer attachments through one flange of the stringer, a longer half ellipse/continuously varying radius trim is preferred for reducing stress and strain concentrations. In this instance, the stringer is trimmed back such that load is distributed away from the stringer end (especially the unfastened stringer flange) and into the stringer web, stringer fastened flange, fitting, and skin as much as is practical. The intent of this trim is to trim as much stringer away as is practical without compromising the Centroid alignment, moment capability, or axial stiffness of the joint.

The disclosure is generally directed to a stringer having a stringer end trim that reduces pull-off forces in a stringer connection structure, including a stringer body; a stringer free edge provided on said stringer body; and a stringer end trim having at least one curvature provided in the stringer free edge forming the stringer connection structure.

The disclosure is also directed to a stringer which has one or multiple radii and is suitable for reducing stress and strain concentrations in a composite wing stringer web. The radius or radii may drive loads from the stringer cap and stringer base flange into the radii to reduce stress and strain at the cap and base flange and along fixed edges of the stringer. An illustrative embodiment of the stringer includes a stringer body, a stringer free edge provided on the stringer body and a stringer end trim having at least one radius provided in the stringer free edge.

The disclosure is further generally directed to a wing-to-body structure or wing/fairing attachments on aerospace products (such as vertical and horizontal airplane stabilizers, wing/fin to body structure or aircraft, rockets and missiles, for example and without limitation). An illustrative embodiment of the wing-to-body structure includes a side of body rib, a stringer having a stringer body carried by the side of body rib, a stringer free edge provided on the stringer body and a stringer end trim having at least one radius provided in the stringer free edge and a wing skin panel carried by the side of body rib and the stringer.

The disclosure is further generally directed to a method for tailored reduction of stress concentrations within the free end of a stringer. An illustrative embodiment of the method includes providing a stringer having a stringer free end and providing at least one radius in the stringer free end.

In some embodiments, the stringer may include a laminated composite stringer body having a first stringer flange, a second stringer flange and a stringer web extending between the first stringer flange and the second stringer flange; a stringer free edge provided on the stringer web; and a double radius stringer end trim provided in the stringer free edge and having a first parabolic and continuously-varying edge radius, a second parabolic and continuously-varying edge radius and a convex transition radius joining the first edge radius and the second edge radius.

In some embodiments, the wing-to-body structure may include a side of body rib; a stringer having a laminated composite stringer body carried by the side of body rib and including a first stringer flange, a second stringer flange, a stringer web extending between the first stringer flange and the second stringer flange, a stringer free edge provided on the stringer web and a double radius stringer end trim provided in the stringer free edge and having a first parabolic and continuously-varying edge radius, a second parabolic and continuously-varying edge radius and a convex transition radius joining the first edge radius and the second edge radius; a wing skin panel carried by the side of body rib and the first stringer flange of the stringer; and a stringer cap fitting carried by the second stringer flange of the stringer.

In some embodiments, the method for tailored reduction of stress concentrations within the free end of a stringer may include providing a stringer having a laminated composite stringer body including a first stringer flange, a second stringer flange and a stringer web extending between the first stringer flange and the second stringer flange with a stringer free end on the stringer web; trimming a double radius stringer end trim having a first parabolic and continuously-varying radius, a second parabolic and continuously-varying radius and a convex transition radius joining the first radius and the second radius in the stringer free end; providing a wing-to-body structure having a side-of-body rib and a wing skin panel carried by the side-of-body rib; and assembling the stringer into the wing-to-body structure by joining the stringer body of the stringer to the side-of-body rib and the wing skin panel. With attachments that include a stringer cap and base flange attachment, a "Double Grodzinski" or double radius stringer end trim configuration may be used. For attachments that include stringer attachments through only one stringer flange, a single radius stringer end trim configuration may be preferred.

The disclosure is further generally directed to a method for reducing peel loading in a stringer of a wing to body structure. An illustrative embodiment of the method includes providing a stringer having a stringer free end and providing at least one radius in the stringer free end.

BRIEF DESCRIPTION OF THE ILLUSTRATIONS

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
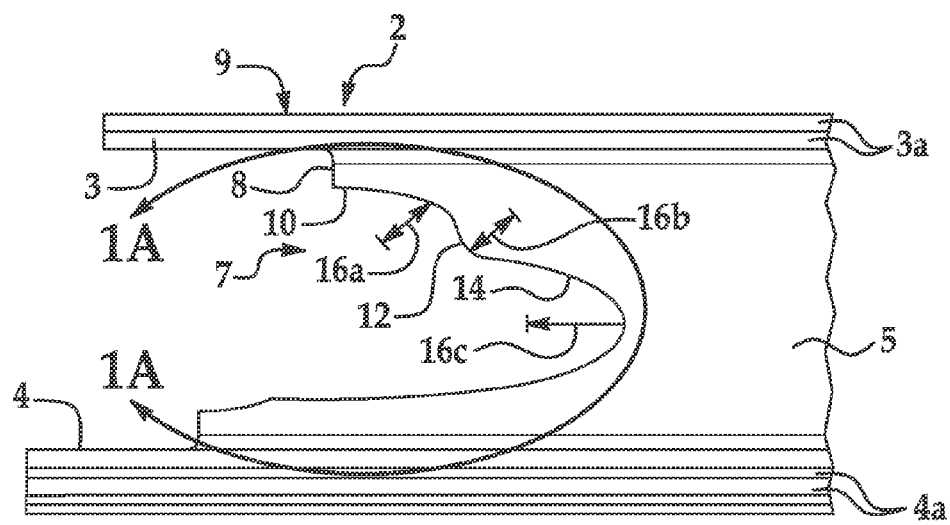
FIG. 1 is an illustration of a side view of a stringer with a double radius stringer end trim provided in the stringer.
Figure 2:
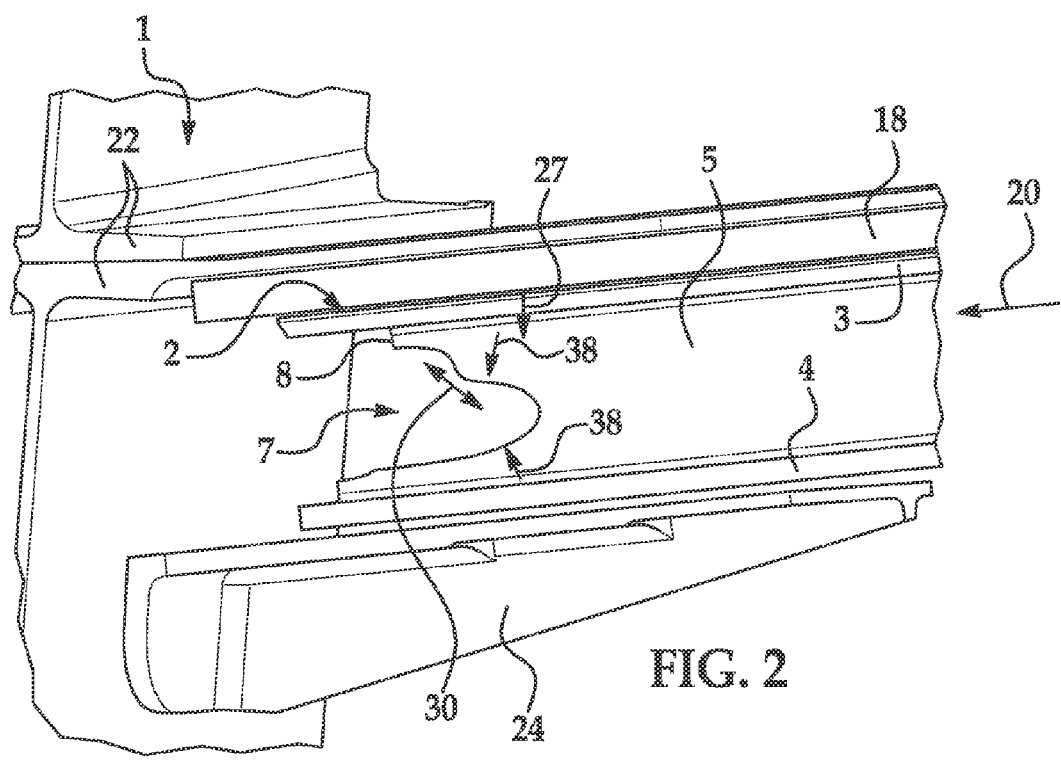
FIG. 2 is an illustration of a perspective view of a wing to body structure having a stringer with a double radius stringer end trim.
Figure 3:
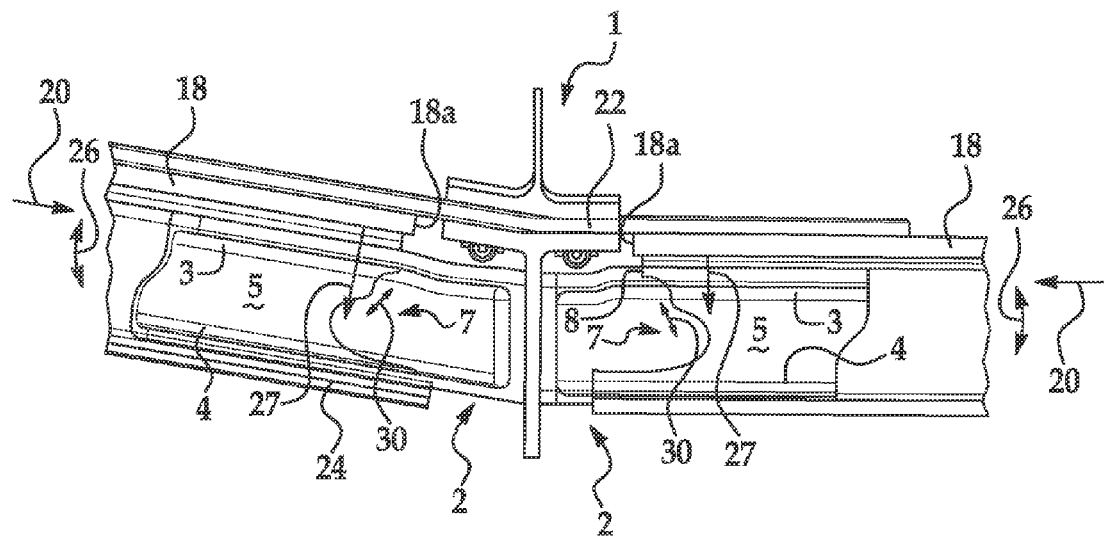
FIG. 3 is an illustration of a sectional view of a wing to body structure having a pair of stringers with a double radius stringer end trim attached to a side of body (SOB) rib.

Referring initially to FIGS. 1-3 of the drawings, an illustrative embodiment of a stringer with a double radius stringer end trim, hereinafter stringer, is generally indicated by reference numeral 2 in FIG. 1. As shown in FIGS. 2 and 3, in some embodiments the stringer 2 may be part of a wing-to-body structure 1 in an aerospace or other application in which it is desired to reduce stress and strain concentrations in a free edge 8 of the stringer 2. In some embodiments, the free edge 8 may be curved as shown in FIG. 1. The stringer 2 may include a stringer body 9 which may be a composite material having a stringer base flange 3, a stringer cap flange 4 and a stringer web 5 extending between the stringer base flange 3 and the stringer cap flange 4. The stringer base 3 may be a laminated composite material having composite laminates 3a. The stringer base flange 3, the stringer cap 4 and/or the stringer web 5 may be a laminated composite material having composite laminates 4a. The stringer 2 may have any of various cross-sectional configurations including a J-configuration, a Z-configuration, a T-configuration or a hat configuration, for example and without limitation.

Figure 1A:
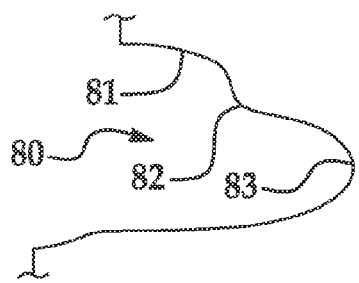
FIG. 1A is a side view of a double Grodzinski radius which is suitable for implementation of the double radius stringer end trim.

The stringer body 9 of the stringer 2 may have a stringer free edge 8. A double radius stringer end trim 7 may be provided in the stringer free edge 8. As shown in FIG. 1A, the double radius stringer end trim 7 may be a double Grodzinski radius 80 which is a double radius configuration having a first continuously varying radius 81, a transition radius 82 extending from the first continuously varying radius 81 and a second continuously varying radius 83 extending from the transition radius 82. As illustrated in FIG. 1, the double radius stringer end trim 7 may include a generally concave first edge radius 10, a generally concave second edge radius 14 and a generally convex transition radius 12 which joins the first edge radius 10 and the second edge radius 14. The first edge radius 10, the transition radius 12 and the second edge radius 14 may have continuously-varying radii 16a-16c, respectively. In some embodiments, the first edge radius 10 and the second edge radius 14 may each have a generally parabolic shape, as shown. The transition radius 12 may provide a smooth transitional contour between the first edge radius 10 and the second edge radius 14. The first edge radius 10, the second edge radius 14 and the transition radius 12 of the double radius stringer end trim 7 may be cut, formed and/or otherwise fabricated in the stringer free edge 8 according to the knowledge of those skilled in the art.

As shown in FIGS. 2 and 3, the stringer 2 may be part of a wing-to-body structure 1 which may include a side of body (SOB) splice plate 22. The SOB splice plate 22 may be metallic, composite material and/or other material which is suitable for the purpose. The stringer 2 may be bonded and/or otherwise attached to a wing skin panel 18 which is attached to the SOB splice plate 22 with the stringer free edge 8 of the stringer 2 generally adjacent to the SOB splice plate 22. The stringer 2 and the wing skin panel 18 may be bolted (not shown) and/or otherwise attached to the SOB splice plate 22. As shown in FIG. 2, in some embodiments a stringer cap fitting 24 may be provided on the stringer cap 4 of the stringer 2.

As shown in FIG. 3, in aerospace or other applications, compression loads 20 may be applied to the wing skin panel 18 and the stringer 2. The compression loads 20 may be transferred from the wing skin panel 18 and the stringer 2 to the SOB splice plate 22. The compression loads 20 may induce a bending moment 26 in the ends 18a of the wing skin panel 18 and the stringer 2. The bending moment 26 may be reacted as a pull-off load 27 which may also be known as peel load in the stringer web 5 of the stringer 2. The double radius stringer end trim 7 may reduce the absolute magnitude of the pull-off load 27 which results from the bending moment 26 at the stringer free edge 8. The double radius stringer end trim 7 may additionally minimize edge-of-trim strains 30 throughout the stringer free edge 8. As illustrated in FIG. 2, the double radius stringer end trim 7 may drive the load path 38 from the stringer base flange 3 and the stringer cap 4 into the double radius stringer end trim 7. This may reduce stress and strain concentrations 30 along the stringer base flange 3 and the stringer cap 4 thus reducing the possibility of stringer being pulled off the skin.

Figure 4:
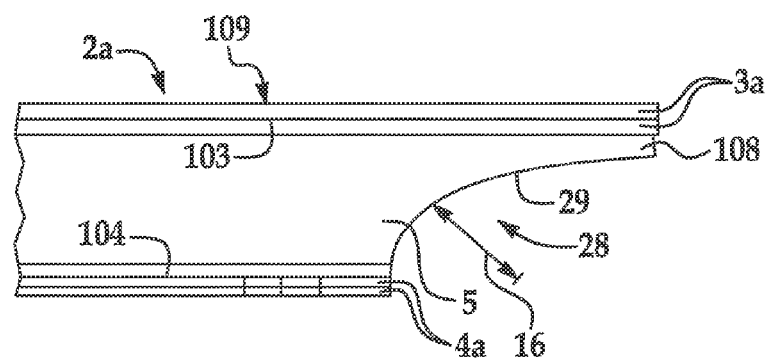
FIG. 4 is an illustration of a side view of a stringer with a single radius stringer end trim.
Figure 5:
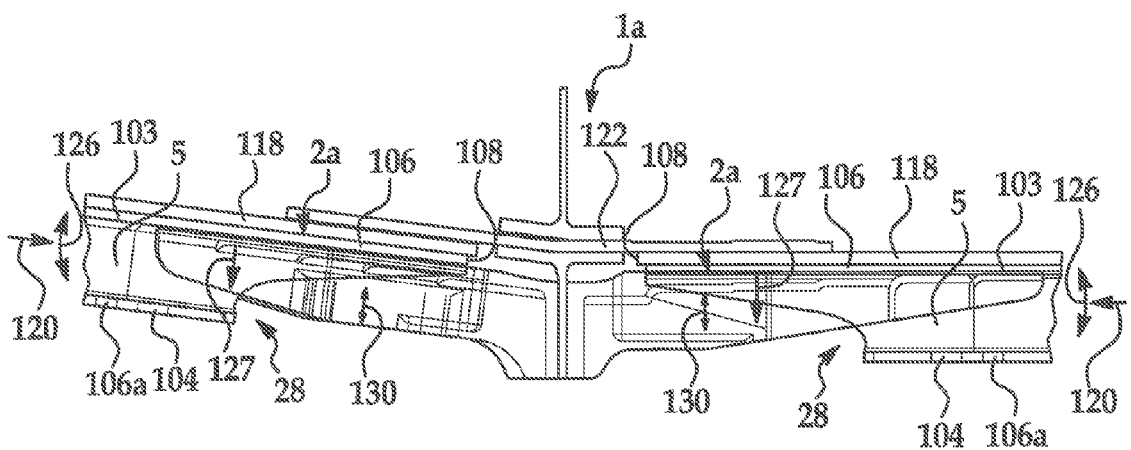
FIG. 5 is an illustration of a sectional view of a wing to body structure having a pair of stringers with a single radius stringer end trim attached to a side of body (SOB) rib.

Referring next to FIGS. 4 and 5, a stringer with a single radius stringer end trim, hereinafter stringer, is generally indicated by reference numeral 2a. A single radius stringer end trim 28 may be provided in the stringer free edge 108 of the stringer body 109 of the stringer 2a. The single radius stringer end trim 28 may have a single edge radius 29 which may have a continuously-varying radius 16. As shown in FIG. 4, in some embodiments the single edge radius 29 of the single radius stringer end trim 28 may extend through the stringer cap flange 104 of the stringer 2a. In some embodiments, the single edge radius 29 may have a generally parabolic shape, as shown. The single radius stringer end trim 28 may be cut, formed and/or otherwise fabricated in the stringer free edge 108 according to the knowledge of those skilled in the art. The stringer 2a may have any of various cross-sectional configurations including a J-configuration, a Z-configuration, a T-configuration or a hat configuration, for example and without limitation.

As shown in FIG. 5, the stringer 2a may be part of a wing-to-body structure 1a which may include a side of body (SOB) slice plate 122. The stringer 2a may be bonded and/or otherwise attached to a wing skin panel 118 which may be attached to the SOB splice plate 122 with the stringer free edge 108 of the stringer 2a generally adjacent to the SOB splice plate 122. The stringer 2a and the wing skin panel 118 may be bolted and/or otherwise attached to the SOB splice plate 122. The stringer 2a with single radius stringer end trim 128 may be used in applications in which structure 118 such as the wing skin panel 118 is provided on only one side 106 of the stringer 2a. In that case, a stringer cap fitting 124 (FIG. 2) may be omitted from the opposite side 106a of the stringer 2.

Application of the stringer 2a may be as was heretofore described with respect to the stringer 2 in FIGS. 2 and 3. Accordingly, in aerospace or other applications, compression loads 120 applied to the wing skin panel 118 may be transferred from the wing skin panel 118 to the stringer 2a through the SOB slice plate 122. A bending moment 126 may be reacted as a pull-off load 127 in the stringer web 5 of the stringer 2a. The single radius stringer end trim 128 may reduce the absolute magnitude of the pull-off load 127 which results from the bending moment 126 at the stringer free edge 108. The single radius stringer end trim 128 may additionally minimize edge-of-trim strains 130 throughout the stringer free edge 108. As illustrated in FIG. 4, the single radius stringer end trim 28 may drive the load path 39 from the stringer base flange 103 and the stringer cap 104 into the single radius stringer end trim 28. This may reduce stress and strain concentrations 130 along the stringer base flange 103 and the stringer cap 104 and thus reducing pull-off loads.

Figure 6:
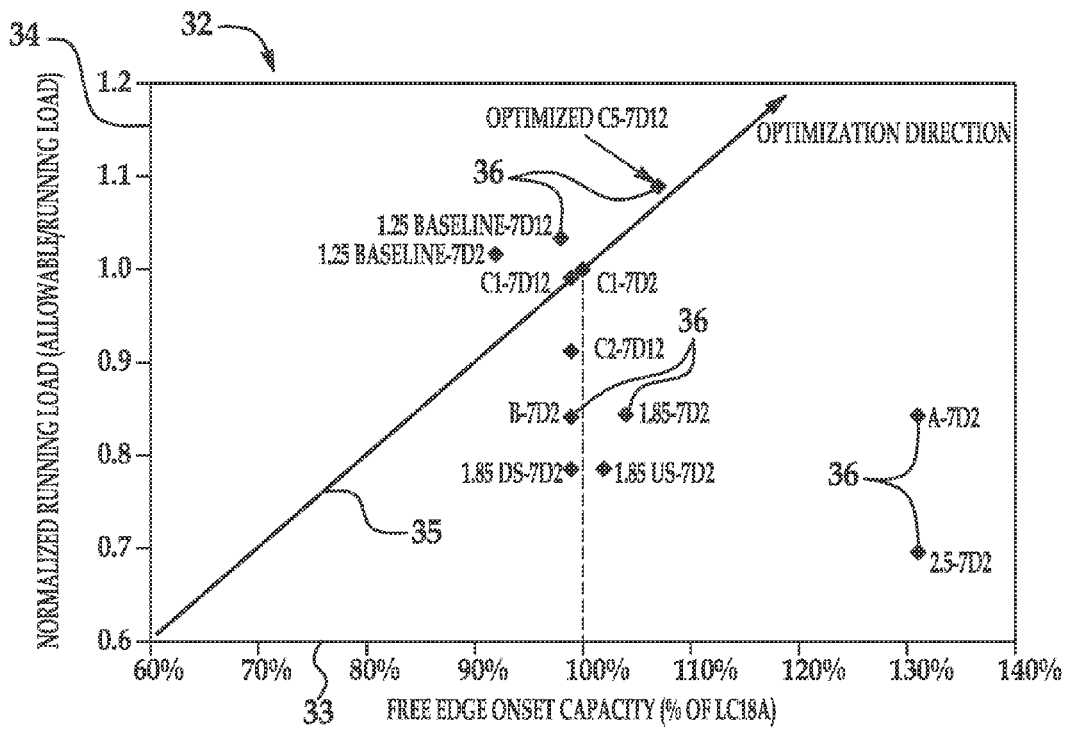
FIG. 6 is a graph which illustrates load optimization of a stringer with a double radius stringer end trim in which normalized pull-off running load (Y-axis) is plotted vs. free edge onset capability (X-axis).

Referring next to FIG. 6, a graph 32 which illustrates load optimization of a stringer 2 (FIG. 1) with a double radius stringer end trim 7 is shown. In the graph 32, free edge onset capability of the stringer 2 is plotted along the X-axis 33 and normalized running load 27 (FIGS. 3, 5) for each value of free edge onset capability is plotted along the Y-axis 34. The optimization direction 35 is shown as a straight line 35. A normalized running load 27 of 1.0 corresponds to a free edge onset capability 33 of 100% of structural loading requirements. Points 36 on the graph 32 illustrate various optimized and non-optimized embodiments of the stringer 2 with double radius stringer end trim 7.

Pull-off load 127 was resulted from the tensional load transferred from stringer web 5 to the stringer flange 103. The proposed stringer end trim 128 will provides a gradual transition, which redistributes the tensional load in a longer transition path and resulted in a lower pull-off running load 127. In addition, the end trim 128 will move the maximum pull-off load away from the free edge 108 to the location where a delamination arrestment and prevention mechanism could be implemented. The end trim utilizes the existing configuration to distribute the maximum load through a double shear fastener location (not shown) rather than directly onto a skin/stringer bond line (not shown). The usage of one radius or double radii curves depended on the cross-sectional configuration of the stringer including the fastener pattern. Generally, a double radius has proven to be optimal/preferred over a single radius for configurations where both sides of the stringer (cap & base flange) are bolted.

Utilizing the Grodzinski curves, associated with the desired load transfer mechanism within the design configuration envelope, resulted in the proposed end trim 128 configuration. Furthermore, the Double Grodzinski has a transition radius 16b (FIG. 1) which provides additional bending capability into the stringer 2 by increasing the stringer stiffness. This feature allows more of the load to transfer into the stringer 2 and away from the base flange 103 thus providing additional pull-off capability due to the slightly lower load through the base flange/skin fastener locations.

Figure 7:
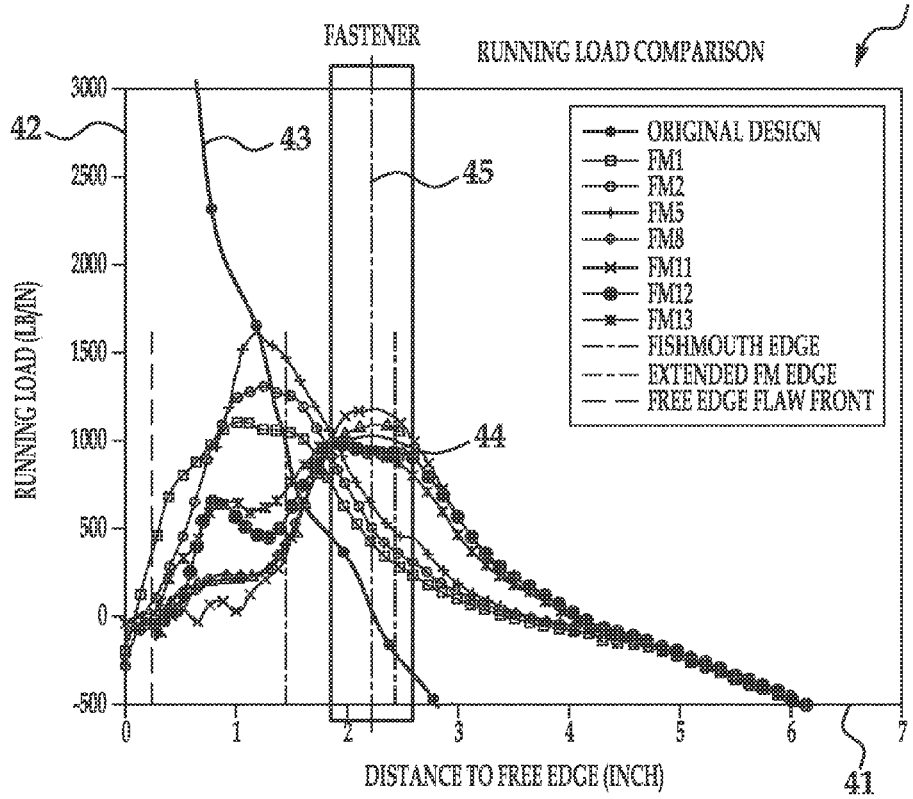
FIG. 7 is a graph which illustrates pull-off running load (lb/in) comparisons between stringers with different end trims.

Referring next to FIG. 7, a graph 40 which illustrates running load (lb/in) 27 (FIG. 3) comparisons between stringers 2a (FIG. 3) with and without end trims 28 is shown.

Distance to the stringer free edge 8 (in inches) is plotted along the X-axis 41 and the running load (lb/in) 27 applied to the stringer 2a is plotted along the Y-axis 42. The maximum running load 43 at the stringer free edge 8 is 5400 lb/in. A fastener position 45 is 2~3 inches from the stringer free edge 8. The low peak running load 27 (FIG. 3) at the stringer free edge 8 and located within the fastener influence range 44 is about 1000 lb/in. The data shown in this comparison was based on a heavy gage stringer configuration.

Figure 8:
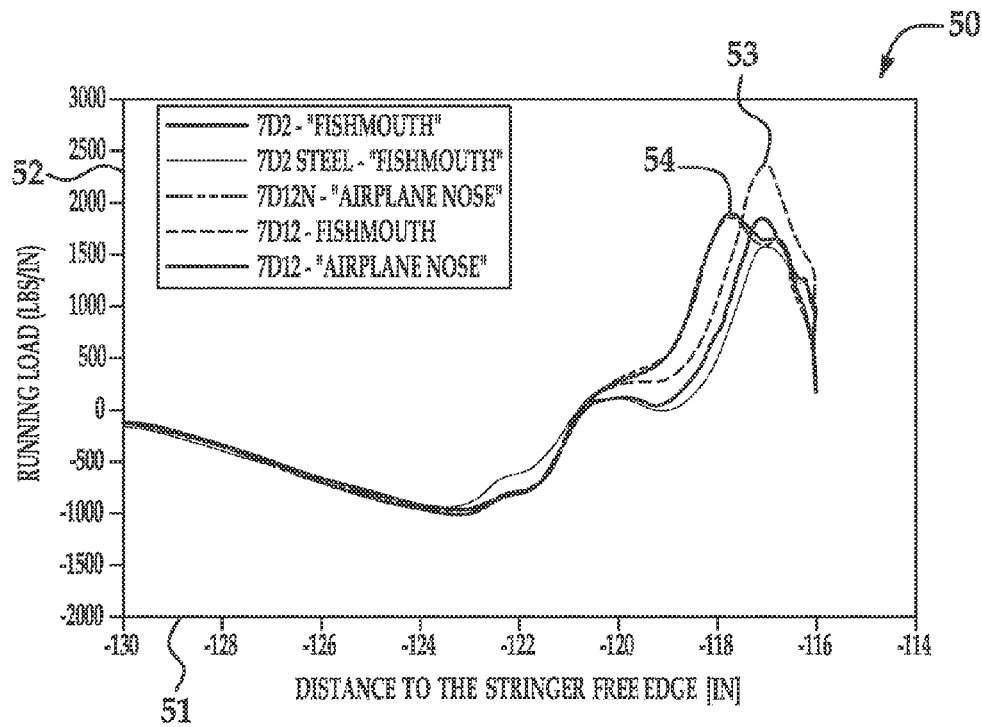
FIG. 8 is a graph which illustrates running load comparisons between stringers with a double radius stringer end trim and stringers with a single radius stringer end trim.

Referring next to FIG. 8, a graph 50 which illustrates peak running load comparisons between stringers 2 (FIG. 1) with a double radius stringer end trim 7 and stringers 2a (FIG. 4) with a single radius stringer end trim 28 is shown. Distance to the stringer free edge 8 (in inches) is plotted along the X-axis 51 and the running load (lb/in) 27 applied to the stringer 2, 2a is plotted along the Y-axis 52. The peak running load 53 for the single radius stringer end trim 28 of the stringer 2a is about 2,400 lbs/in. The peak running load 54 for the double radius stringer end trim 7 of the stringer 2 is about 1,800 lbs/in. This corresponds to a 33% reduction in the peak pull off load 27 (FIG. 3).

Figure 9:
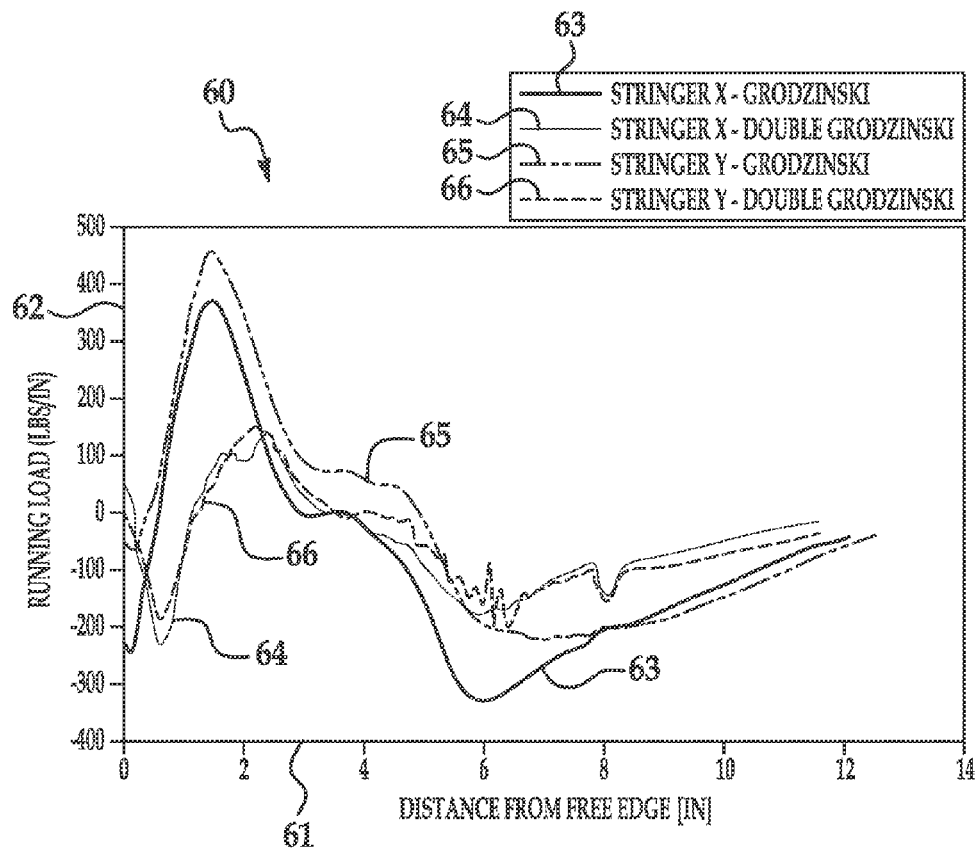
FIG. 9 is a graph which illustrates pull-off running load comparisons between baseline stringers with a single radius stringer end trim (~375 lbs/in) and stringers with a double radius stringer end trim with pull-off running load (~150 lbs/in) plotted as a function of distance in inches from the free edge of the stringer.

Referring next to FIG. 9, a graph 60 which illustrates running load 27 comparisons for a light gage stringer configuration between a stringer 2 with a single radius end trim 7 and test stringers 2 with a double radius stringer end trim 7 is shown. The distance in inches from the free edge 8 of the stringers 2 is plotted on the X-axis 61. The running load 27 in lbs/in applied to the stringer 2 is plotted on the Y-axis 62. A first stringer with a single radius end trim 63 had a maximum running load 27 of ~375 lbs/in. A second stringer with a single radius end trim 65 had a maximum running load 27 of ~460 lbs/in. The first stringer with a double radius trim 64 had a maximum running load 27 of ~150 lbs/in. The second stringer with a double radius trim 66 had a maximum running load 27 of ~160 lbs/in. Compared to the first stringer with a single radius trim 63 and the second stringer with a single radius trim 65, the first stringer with a double radius trim 64 and the second stringer with a double radius trim 66 both had a lower running load 27. The end trim helps both static load situation and dynamic load situation. The effectiveness was assessed and covered both static load condition as well as dynamic load condition (fatigue).

Figure 10:
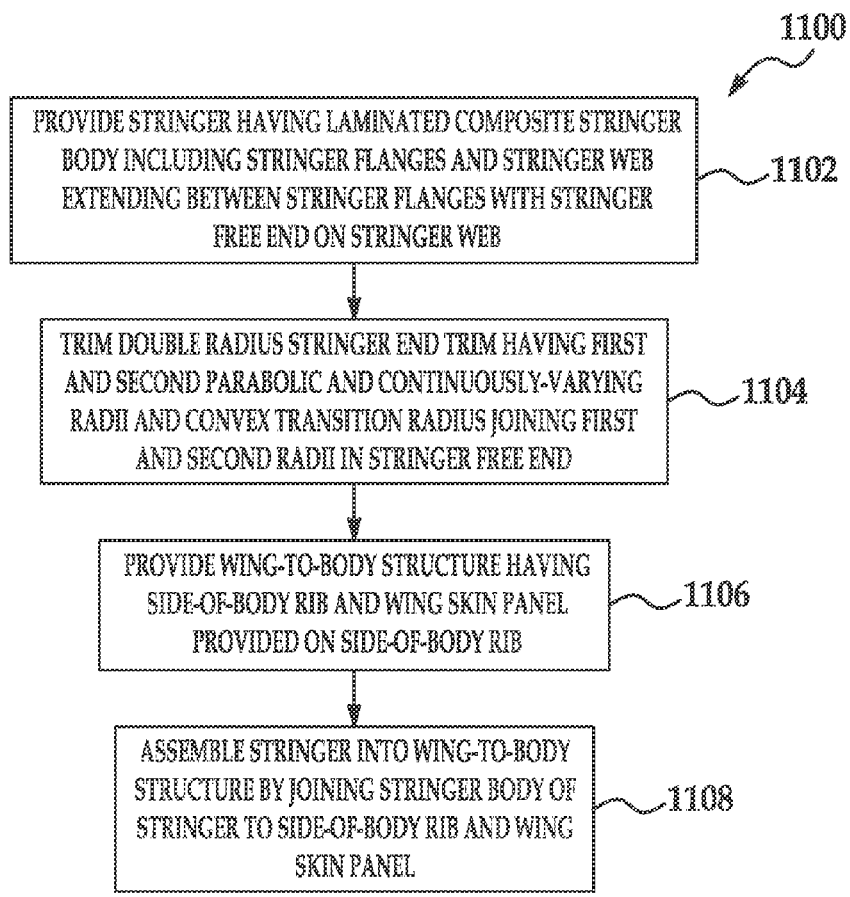
FIG. 10 is an illustration of a flow diagram which illustrates a method for the tailored reduction of stress concentrations within the free end of a composite lamina assembled stringer.

Referring next to FIG. 10, a flow diagram 1100 which illustrates a method for the tailored reduction of stress concentrations within the stringer free end 8 of a composite lamina assembled stringer 2 is shown. In block 1102, a stringer 2 having a laminated composite stringer body 9 including stringer flanges 3, 4 and a stringer web 5 extending between the stringer flanges 3, 4 and with a stringer free end 8 on the stringer web 5 is provided. In block 1104, a double radius stringer end trim 7 having first 10 and second 14 parabolic and continuously-varying radii and a smooth, convex transition radius 12 joining the first 10 and second 14 radii is trimmed in the stringer free end 8. In block 1106, a wing-to-body structure 1 having a side-of-body rib 22 and a wing skin panel 18 provided on the side-of-body rib 22 is provided. In block 1108, the stringer 2 may be assembled into the wing-to-body structure 1 by joining the stringer body 9 of the stringer 2 to the side-of-body rib 22 and the wing skin panel 18.

Figure 11:
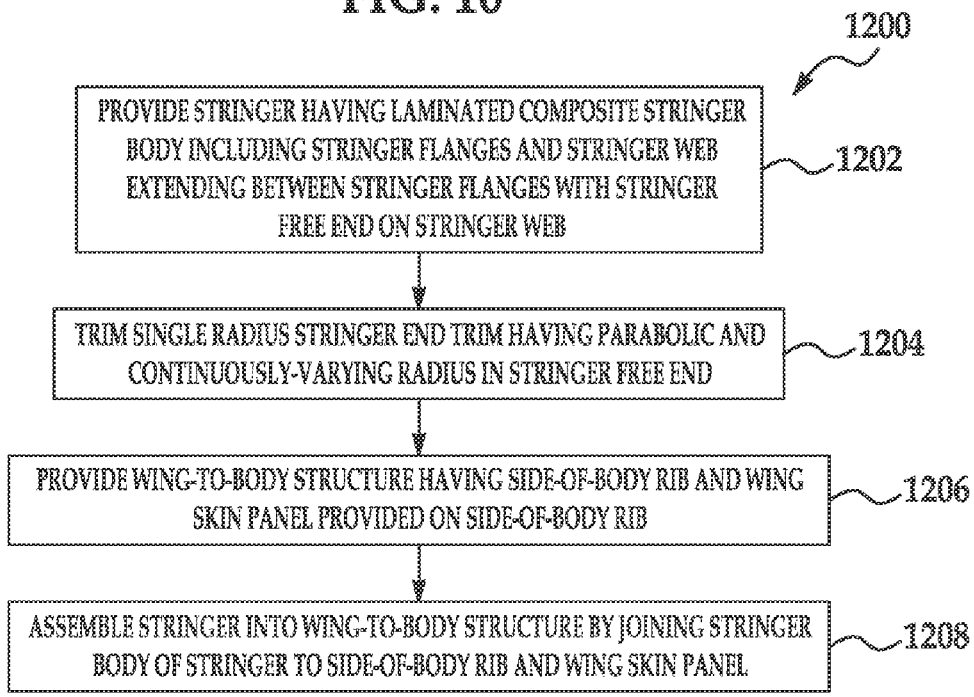
FIG. 11 is an illustration of a flow diagram which illustrates a method for a tailored reduction of stress concentration in a stringer runout.

Referring next to FIG. 11, a flow diagram 1200 which illustrates a method for the tailored reduction of stress concentrations within the stringer free end 8 of a composite lamina assembled stringer 2a is shown. In block 1202, a stringer 2a having a laminated composite stringer body 9 including stringer flanges 3, 4 and a stringer web 5 extending between the stringer flanges 3, 4 and with a stringer free end 8 on the stringer web 5 is provided. In block 1204, a single radius stringer end trim 28 having a parabolic and continuously-varying single edge radius is trimmed in the stringer free end 8. In block 1206, a wing-to-body structure 1a having a side-of-body splice plate 22 and a wing skin panel 18 provided on the side-of-body splice plate 22 is provided. In block 1208, the stringer 2a may be assembled into the wing-to-body structure 1a by joining the stringer body 9 of the stringer 2a to the side-of-body splice plate 22 and the wing skin panel 18.

Figure 11A:
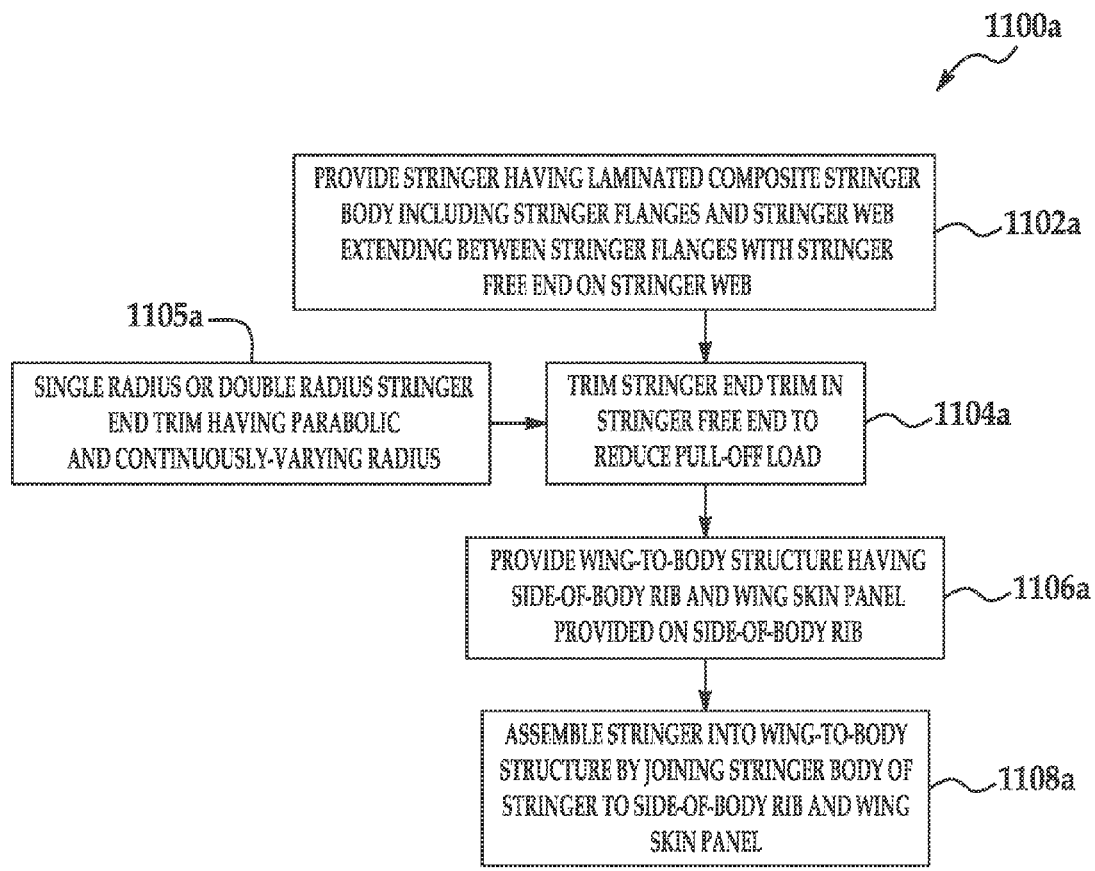
FIG. 11A is an illustration of a flow diagram which illustrates a method of reducing peel loading in a stringer of a wing to body structure.

Referring next to FIG. 11A, a flow diagram 1100a which illustrates a method of reducing peel loading in a stringer of a wing to body structure is shown. In block 1102a, a stringer 2 having a laminated composite stringer body 9 including stringer flanges 3, 4 and a stringer web 5 extending between the stringer flanges 3, 4 and with a stringer free end 8 on the stringer web 5 is provided. In block 1104a and 1105a, a single radius stringer end trim 28 having a parabolic and continuously-varying single edge radius is trimmed in the stringer free end 8 or a double radius stringer end trim 7 having first 10 and second 14 parabolic and continuously-varying radii and a smooth, convex transition radius 12 joining the first 10 and second 14 radii is trimmed in the stringer free end 8. In block 1106a, a wing-to-body structure 1 having a side-of-body rib 22 and a wing skin panel 18 provided on the side-of-body rib 22 is provided. In block 1108a, the stringer 2 may be assembled into the wing-to-body structure 1 by joining the stringer body 9 of the stringer 2 to the side-of-body rib 22 and the wing skin panel 18.

Figure 12:
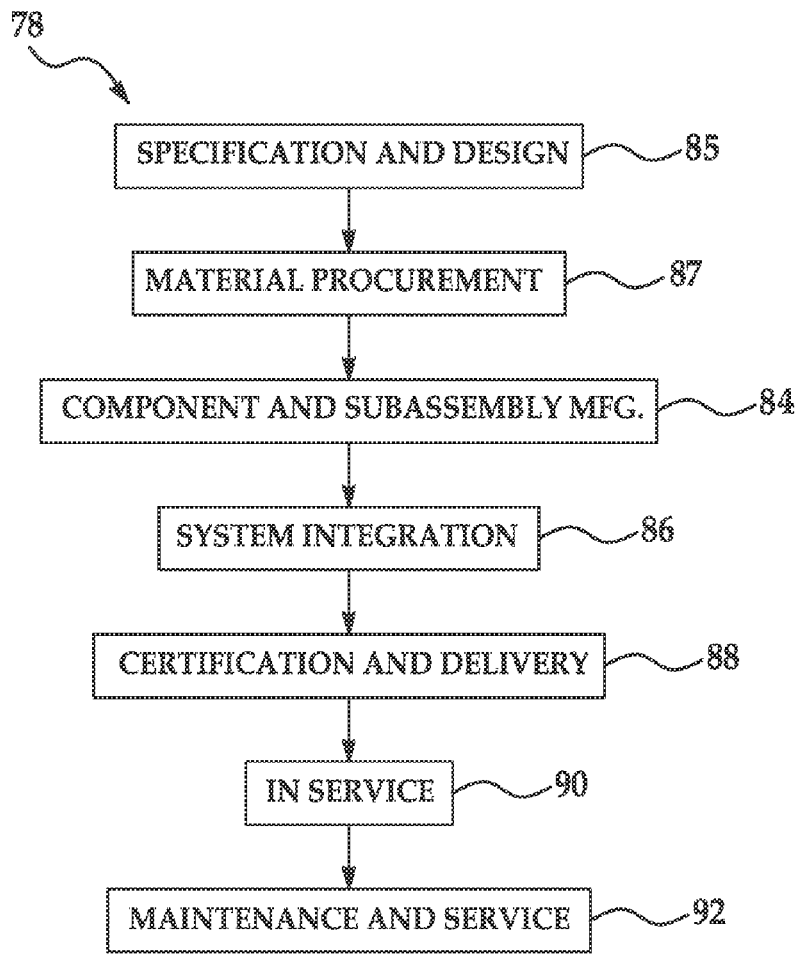
FIG. 12 is an illustration of a flow diagram of an aircraft production and service methodology.
Figure 13:
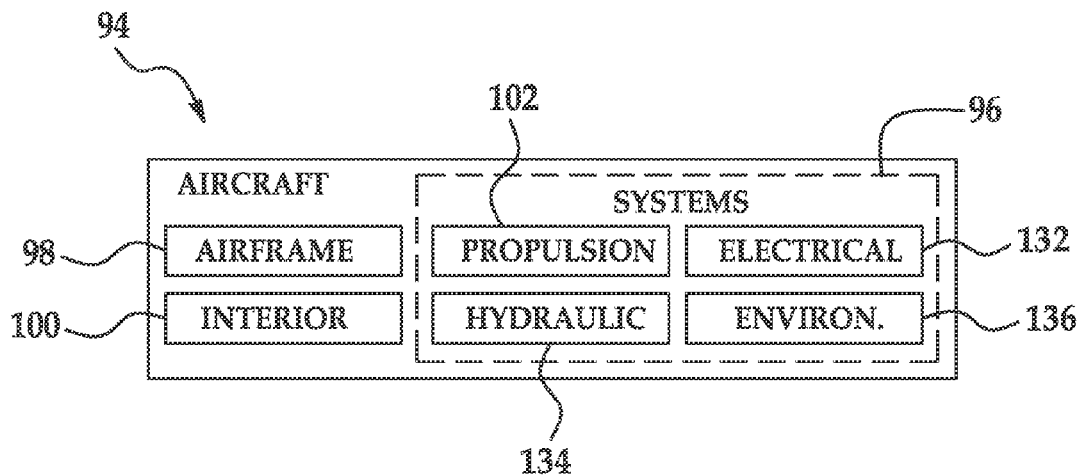
FIG. 13 is an illustration of a block diagram of an aircraft.

Referring next to FIGS. 12 and 13, embodiments of the disclosure may be used in the context of an aircraft manufacturing and service method 78 as shown in FIG. 12 and an aircraft 94 as shown in FIG. 13. During pre-production, exemplary method 78 may include specification and design 85 of the aircraft 94 and material procurement 87. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 13, the aircraft 94 produced by exemplary method 78 may include an airframe 98 with a plurality of systems 96 and an interior 100. Examples of high-level systems 96 include one or more of a propulsion system 102, an electrical system 132, a hydraulic system 134, and an environmental system 136. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A stringer having a stringer end trim configured to reduce pull-off forces, the stringer comprising:
    a stringer body having a first stringer flange, a second stringer flange and a stringer web extending between said first stringer flange and the second stringer flange; and
    a stringer free edge on the stringer body, the stringer free edge comprising the stringer end trim, the stringer end trim having at least one asymmetric curvature, the stringer end trim in the stringer web.

2. The stringer of claim 1 wherein the stringer end trim having at least one asymmetric curvature comprises a single curvature stringer end trim having a single edge radius.

3. The stringer of claim 2 wherein the single edge radius has a continuously-varying radius.

4. The stringer of claim 2 wherein the single edge radius comprises a single parabolic radius.

5. The stringer of claim 1 wherein the stringer end trim having at least one asymmetric curvature comprises a double curvature stringer end trim.

6. The stringer of claim 5 wherein the double curvature stringer end trim has a double parabolic radius.

7. The stringer of claim 5 wherein the double curvature stringer end trim comprises a first edge radius, a second edge radius and a transition radius joining the first edge radius and the second edge radius.

8. The stringer of claim 1 wherein the stringer body comprises a composite material.

9. A wing-to-body structure, comprising:
    a side of body rib;
    a stringer having a stringer body carried by the side of body rib, the stringer body comprising a first stringer flange, a second stringer flange and a stringer web extending between the first stringer flange and the second stringer flange, a stringer free edge on the stringer body, a stringer end trim having at least one radius having an asymmetric curvature in the stringer free edge in the stringer web; and
    a wing skin panel carried by the side of body rib and said stringer.

10. The wing-to-body structure of claim 9 wherein the stringer end trim having at least one radius comprises a single radius stringer end trim having a single edge radius.

11. The wing-to-body structure of claim 10 wherein the single edge radius has a continuously-varying radius.

12. The wing-to-body structure of claim 9 wherein the stringer end trim having at least one radius comprises a double radius stringer end trim.

13. The wing-to-body structure of claim 12 wherein the double radius stringer end trim comprises a first edge radius, a second edge radius and a transition radius joining the first edge radius and the second edge radius.

14. The wing-to-body structure of claim 13 further comprising a stringer cap fitting carried by the stringer body.

15. A method comprising:
    trimming at least one asymmetric curvature in a stringer free end of a stringer, the stringer comprising a first stringer flange, a second stringer flange and a stringer web extending between the first stringer flange and the second stringer flange, the stringer free end on the stringer web.

16. The method of claim 15 wherein trimming at least one asymmetric curvature in the stringer free end comprises trimming at least one radius in said stringer free end.

17. The method of claim 15 wherein trimming at least one asymmetric curvature in the stringer free end comprises trimming a plurality of radii in the stringer free end.

18. The method of claim 17 wherein trimming a plurality of radii in the stringer free end comprises trimming a first edge radius in the stringer free end, trimming a second edge radius in the stringer free end, and trimming a transition radius in the stringer free end, the transition radius joining the first edge radius and the second edge radius.

19. The method of claim 18 wherein each of the first edge radius and the second edge radius has a continuously-varying radius.

20. The method of claim 15 wherein trimming at least one asymmetric curvature in the stringer free end comprises providing a single continuously-varying radius in the stringer free end.

21. A stringer, comprising:
    a laminated composite stringer body having a first stringer flange, a second stringer flange and a stringer web extending between the first stringer flange and the second stringer flange;
    a stringer free edge provided on said stringer web; and
    a double radius stringer end trim provided in the stringer free edge and having a first parabolic and continuously-varying edge radius, a second parabolic and continuously-varying edge radius, and a convex transition radius joining the first edge radius and the second edge radius.

22. A wing-to-body structure, comprising:
    a side of body rib;
    a stringer having a laminated composite stringer body carried by the side of body rib and including a first stringer flange, a second stringer flange, a stringer web extending between the first stringer flange and the second stringer flange, a stringer free edge provided on the stringer web and a double radius stringer end trim provided in the stringer free edge and having a first parabolic and continuously-varying edge radius, a second parabolic and continuously-varying edge radius and a convex transition radius joining the first edge radius and the second edge radius;
    a wing skin panel carried by the side of body rib and said first stringer flange of the stringer; and
    a stringer cap fitting carried by the second stringer flange of said stringer.

23. A method for tailored reduction of stress concentrations within a free end of a stringer, comprising:
    providing a stringer having a laminated composite stringer body including a first stringer flange, a second stringer flange, and a stringer web extending between the first stringer flange and the second stringer flange with a stringer free end on the stringer web;
    trimming a double radius stringer end trim having a first parabolic and continuously-varying radius, a second parabolic and continuously-varying radius and a convex transition radius joining the first radius and the second radius in the stringer free end;

providing a wing-to-body structure having a side-of-body rib and a wing skin panel carried by the side-of-body rib; and assembling the stringer into the wing-to-body structure by joining the stringer body of the stringer to the side-of-body rib and the wing skin panel.

24. A method comprising:

forming at least one radius having an asymmetric curvature in a stringer free end of a stringer, the stringer comprising a first stringer flange, a second stringer flange and a stringer web extending between the first stringer flange and the second stringer flange, the stringer free end on the stringer web.

25. The method of claim 24 wherein forming at least one radius having an asymmetric curvature in the stringer free end comprises forming a plurality of radii in the stringer free end.

26. The method of claim 25 wherein forming the plurality of radii in the stringer free end comprises:

forming a first edge radius in the stringer free end;
forming a second edge radius in the stringer free end; and
forming a transition radius in the stringer free end joining the first edge radius and the second edge radius with the transition radius.

27. The method of claim 26 wherein each of the first edge radius and the second edge radius each has a continuously-varying radius.

28. The method of claim 24 wherein forming at least one radius having an asymmetric curvature in the stringer free end comprises forming a single continuously-varying radius in the stringer free end.

* * * * *